(12) United States Patent
Fredricks et al.

(10) Patent No.: US 11,096,328 B2
(45) Date of Patent: Aug. 24, 2021

(54) AGRICULTURAL HEADER WITH DAMAGE-REDUCING CLUTCH

(71) Applicant: CNH Industrial America LLC, New Holland, PA (US)

(72) Inventors: Eric Fredricks, Davenport, IA (US); Bryan B. Finley, Bettendorf, IA (US)

(73) Assignee: CNH Industrial America LLC, New Holland, PA (US)

( * ) Notice: Subject to any disclaimer, the term of this patent is extended or adjusted under 35 U.S.C. 154(b) by 321 days.

(21) Appl. No.: 16/233,889

(22) Filed: Dec. 27, 2018

(65) Prior Publication Data

US 2020/0205341 A1 Jul. 2, 2020

(51) Int. Cl.
| | |
|---|---|
| *A01D 41/14* | (2006.01) |
| *A01D 47/00* | (2006.01) |
| *F16D 13/16* | (2006.01) |
| *F16D 19/00* | (2006.01) |
| *F16D 13/40* | (2006.01) |

(Continued)

(52) U.S. Cl.
CPC ........... *A01D 41/142* (2013.01); *A01D 47/00* (2013.01); *F16D 13/16* (2013.01); *F16D 13/40* (2013.01); *F16D 19/00* (2013.01); *F16D 21/00* (2013.01); *F16D 43/10* (2013.01); *F16D 43/18* (2013.01); *A01D 41/02* (2013.01); *F16D 2127/02* (2013.01); *F16D 2129/04* (2013.01); *F16D 2300/14* (2013.01)

(58) Field of Classification Search
CPC .......... F16D 19/00; F16D 13/40; F16D 43/10; F16D 43/18; F16D 21/00; F16D 2300/14; F16D 2127/02; F16D 2129/04; F16D 2043/145; F16D 43/14; F16D 11/10; F16D 13/16; F16D 13/62; F16D 2023/123; F16D 23/12; F16D 43/215; F16D 7/02; A01D 41/142; A01D 47/00; A01D 41/02; A01D 34/30; A01D 69/00; A01D 69/08

See application file for complete search history.

(56) References Cited

U.S. PATENT DOCUMENTS

| | | | |
|---|---|---|---|
| 1,916,126 A * | 6/1933 | Nardone | F16D 43/18 |
| | | | 192/105 BA |
| 3,055,476 A * | 9/1962 | Flora | F16D 43/18 |
| | | | 192/104 R |

(Continued)

FOREIGN PATENT DOCUMENTS

CN 106068933 A 11/2016

*Primary Examiner* — Arpad Fabian-Kovacs
(74) *Attorney, Agent, or Firm* — Peter Zacharias; Patrick Sheldrake

(57) ABSTRACT

An agricultural header includes: a header frame; at least one cutting unit carried by the header frame and including a cutting element and a driveshaft coupled to the cutting element; and a gearbox configured to drive the cutting element. The gearbox includes a gearbox output rotatably coupled to the driveshaft; and a clutch including an intermediate shaft and at least one clutch shoe rotatably coupled to the intermediate shaft and displaceable between a non-engaging position where the at least one clutch shoe does not engage the gearbox output and an engaging position where the at least one clutch shoe engages the gearbox output. The clutch is configured such that the at least one clutch shoe displaces to the engaging position when a rotational speed of the intermediate shaft reaches a threshold value.

16 Claims, 8 Drawing Sheets

(51) Int. Cl.
  *F16D 43/10* (2006.01)
  *F16D 43/18* (2006.01)
  *F16D 21/00* (2006.01)
  *A01D 41/02* (2006.01)
  *F16D 127/02* (2012.01)
  *F16D 129/04* (2012.01)

(56) References Cited

U.S. PATENT DOCUMENTS

| | | | |
|---|---|---|---|
| 3,523,411 A | 8/1970 | Waldrop et al. | |
| 3,589,110 A | 6/1971 | Schreiner et al. | |
| 3,643,767 A | 2/1972 | Fleming | |
| 3,858,384 A | 1/1975 | Maiste et al. | |
| 4,279,117 A * | 7/1981 | Lawrence | A01D 34/6812 192/105 CF |
| 4,478,027 A * | 10/1984 | De Coene | A01D 43/10 56/13.6 |
| 4,552,547 A * | 11/1985 | Carnewal | A01D 41/12 474/101 |
| 4,553,379 A | 11/1985 | Kalverkamp | |
| 5,056,302 A * | 10/1991 | Rosenbalm | A01D 43/105 464/48 |
| 6,470,658 B1 * | 10/2002 | Wubbels | A01D 69/08 464/17 |
| 7,520,118 B1 * | 4/2009 | Priepke | A01D 34/30 56/257 |
| 7,805,919 B2 * | 10/2010 | Priepke | A01D 34/30 56/257 |
| 7,937,918 B1 | 5/2011 | Mossman | |
| 8,577,559 B2 | 11/2013 | Hel et al. | |
| 2005/0109573 A1 * | 5/2005 | Omata | F16D 67/02 192/14 |
| 2005/0178637 A1 * | 8/2005 | Tsuchiya | F16D 43/18 192/105 CD |
| 2011/0240433 A1 * | 10/2011 | Fang | F16D 43/18 192/45.1 |
| 2012/0018268 A1 * | 1/2012 | Yang | F16D 43/18 192/31 |
| 2013/0020170 A1 * | 1/2013 | Kataoka | F16D 43/18 192/103 B |
| 2013/0334005 A1 * | 12/2013 | Wu | F16D 43/14 192/103 B |
| 2016/0069401 A1 * | 3/2016 | Yuasa | A01D 69/08 192/76 |
| 2018/0195560 A1 * | 7/2018 | Chino | F16D 13/16 |
| 2019/0072140 A1 * | 3/2019 | Aono | F16D 43/18 |
| 2019/0234470 A1 * | 8/2019 | Yokomichi | F16D 43/14 |
| 2019/0338813 A1 * | 11/2019 | Aono | F16D 43/18 |
| 2020/0191209 A1 * | 6/2020 | Yamamoto | F16D 13/40 |

* cited by examiner

AGRICULTURAL HEADER WITH DAMAGE-REDUCING CLUTCH

FIELD OF THE INVENTION

The present invention pertains to an agricultural harvester and, more specifically, to a header for an agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

While traveling in a field, the header sometimes comes into contact with objects, such as rocks, that can damage the header. The damage may be particularly significant if the contacted object is large and/or stuck in the ground. While some elements of the header, such as the cutting elements, are more prone to damage, other elements of the header and/or harvester are also at risk of damage when the header contacts an object in the field.

What is needed in the art is an agricultural harvester that is less prone to significant damage when contacting an object in a field.

SUMMARY OF THE INVENTION

Exemplary embodiments provided in accordance with the present disclosure provide a header with a clutch having one or more clutch shoes that displace from a non-engaging position to an engaging position when a rotational speed of a rotationally coupled intermediate shaft reaches a threshold value.

In some exemplary embodiments provided in accordance with the present disclosure, an agricultural header includes: a header frame; at least one cutting unit carried by the header frame and including a cutting element and a driveshaft coupled to the cutting element; and a gearbox configured to drive the cutting element. The gearbox includes a gearbox output rotatably coupled to the driveshaft; and a clutch including an intermediate shaft and at least one clutch shoe rotatably coupled to the intermediate shaft and displaceable between a non-engaging position where the at least one clutch shoe does not engage the gearbox output and an engaging position where the at least one clutch shoe engages the gearbox output. The clutch is configured such that the at least one clutch shoe displaces to the engaging position when a rotational speed of the intermediate shaft reaches a threshold value.

In some exemplary embodiments provided in accordance with the present disclosure, an agricultural harvester with the present disclosure, an agricultural harvester includes a chassis a header carried by the chassis. The header includes: a header frame; at least one cutting unit carried by the header frame and including a cutting element and a driveshaft coupled to the cutting element; and a gearbox configured to drive the cutting element. The gearbox includes a gearbox output rotatably coupled to the driveshaft; and a clutch including an intermediate shaft and at least one clutch shoe rotatably coupled to the intermediate shaft and displaceable between a non-engaging position where the at least one clutch shoe does not engage the gearbox output and an engaging position where the at least one clutch shoe engages the gearbox output. The clutch is configured such that the at least one clutch shoe displaces to the engaging position when a rotational speed of the intermediate shaft reaches a threshold value.

One possible advantage that may be realized by exemplary embodiments disclosed herein is that the displaceable clutch shoe(s) can mitigate the damage to the gearbox caused by sudden deceleration forces that occur when, for example, the cutting element contacts an object.

Another possible advantage that may be realized by exemplary embodiments disclosed herein is that one or more of the cutting units of the harvester can be selectively disengaged during operation.

Yet another possible advantage that may be realized by exemplary embodiments disclosed herein is that the clutch shoe(s) can allow a gradual rundown of the cutting element.

Yet another possible advantage that may be realized by exemplary embodiments disclosed herein is that the clutch can be housed in the gearbox to reduce damage and loss of performance due to debris encountered during harvesting.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1A:
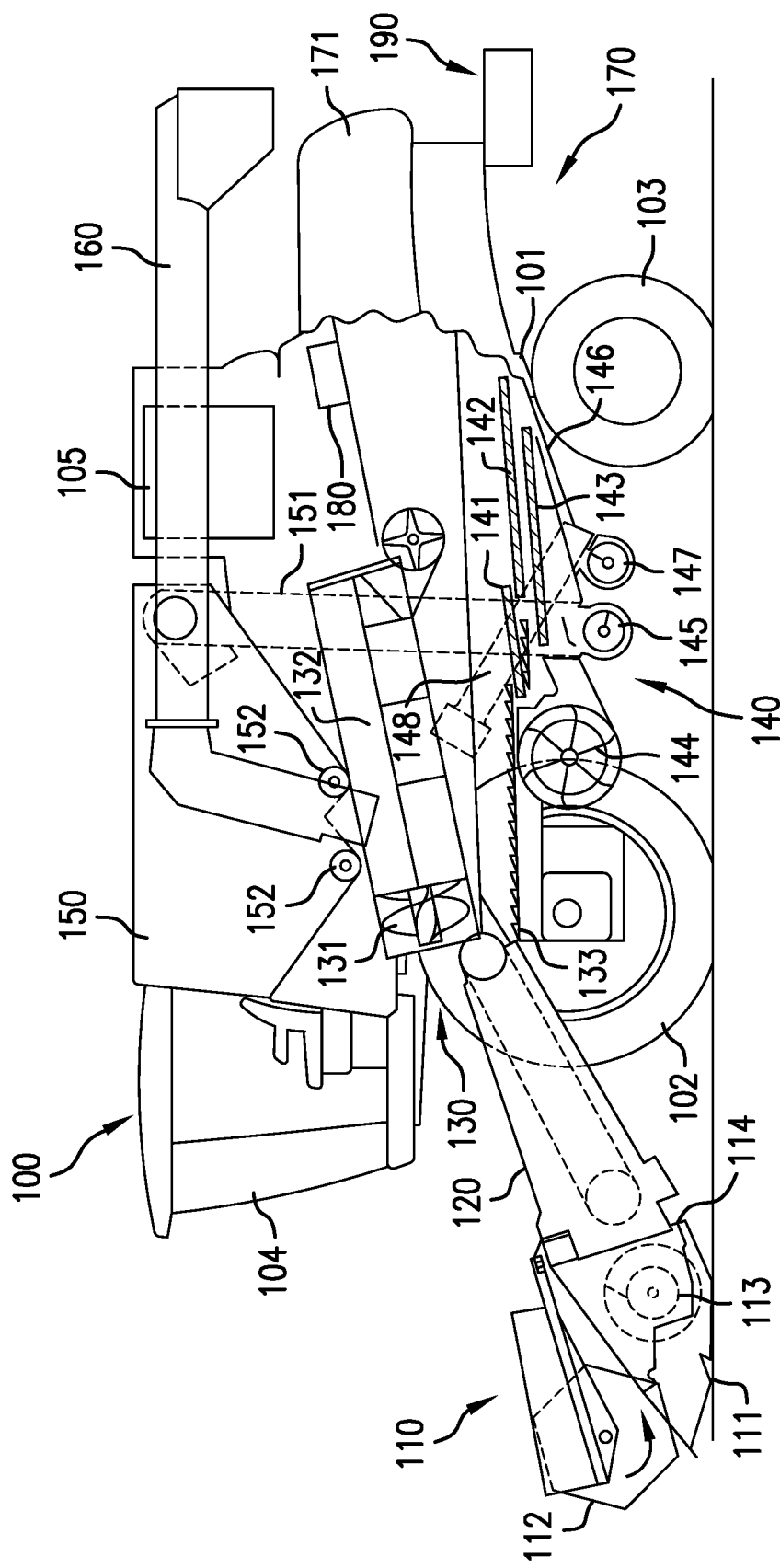
FIG. 1A illustrates a side view of an exemplary embodiment of an agricultural harvester, the agricultural harvester comprising a header that is configured to harvest grain and provided in accordance with an exemplary embodiment of the present disclosure.

Referring now to the drawings, and more particularly to FIG. 1A, there is shown an exemplary embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes at least one cutting unit 111 for severing crops, such as grain, from a field during forward motion of combine 100. A rotatable reel 112 feeds the crop into header 110, and a double auger 113 feeds the severed crop laterally inwardly from each side toward feeder housing 120. The cutting unit 111, reel 112, and double auger 113 may all be carried by a header frame 114 that is coupled to the feeder housing 120. Feeder housing 120 conveys the cut crop to threshing and separating system 130, and is selectively vertically movable using appropriate actuators, such as hydraulic cylinders.

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 190. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 1B:
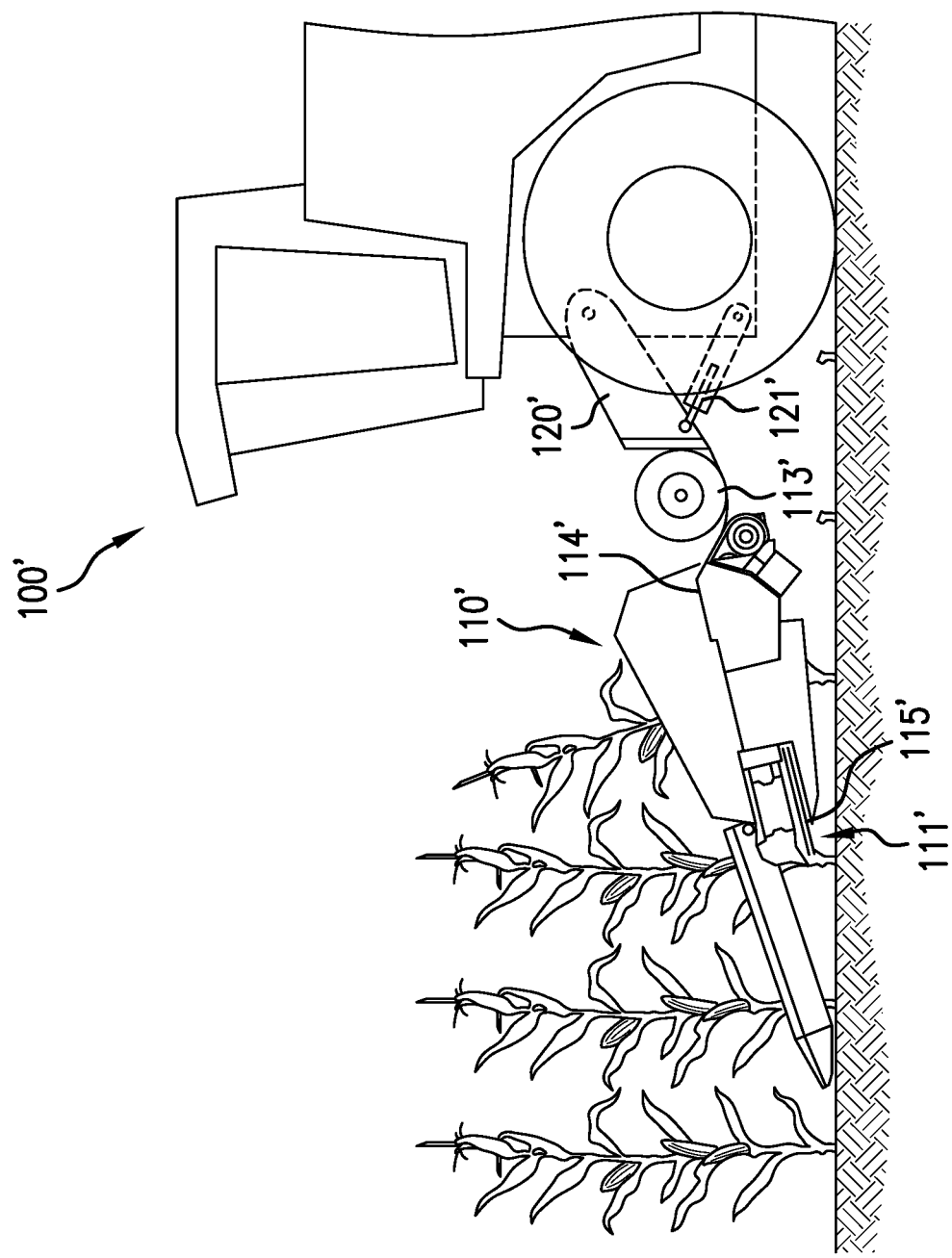
FIG. 1B illustrates a side view of another exemplary embodiment of an agricultural harvester, the agricultural harvester comprising a header that is configured to harvest corn and provided in accordance with an exemplary embodiment of the present disclosure.

While the previously described combine 100 is illustrated in FIG. 1A and described as including a header 110 that is configured for harvesting grain, the present disclosure is applicable to other types of agricultural harvesters. Referring now to FIG. 1B, another exemplary embodiment of an agricultural harvester 100' is illustrated that includes a header 110' that is configured for harvesting corn or other stalked crops. The header 110' is mounted to the harvester 100' by a feeder housing 120' and an actuator 121'. The header 110' includes a header frame 114' carrying one or more cutting units 111' that can be used to, for example, chop stalks using a rotated stalk chopper 115', which may be a bladed wheel and also be referred to as a "cutting element." Crop material collected by the header 110' may then be conveyed to the feeder housing 120' by a screw conveyor 113'. Such agricultural vehicles 100' are known, so further description is omitted for brevity.

Figure 2:
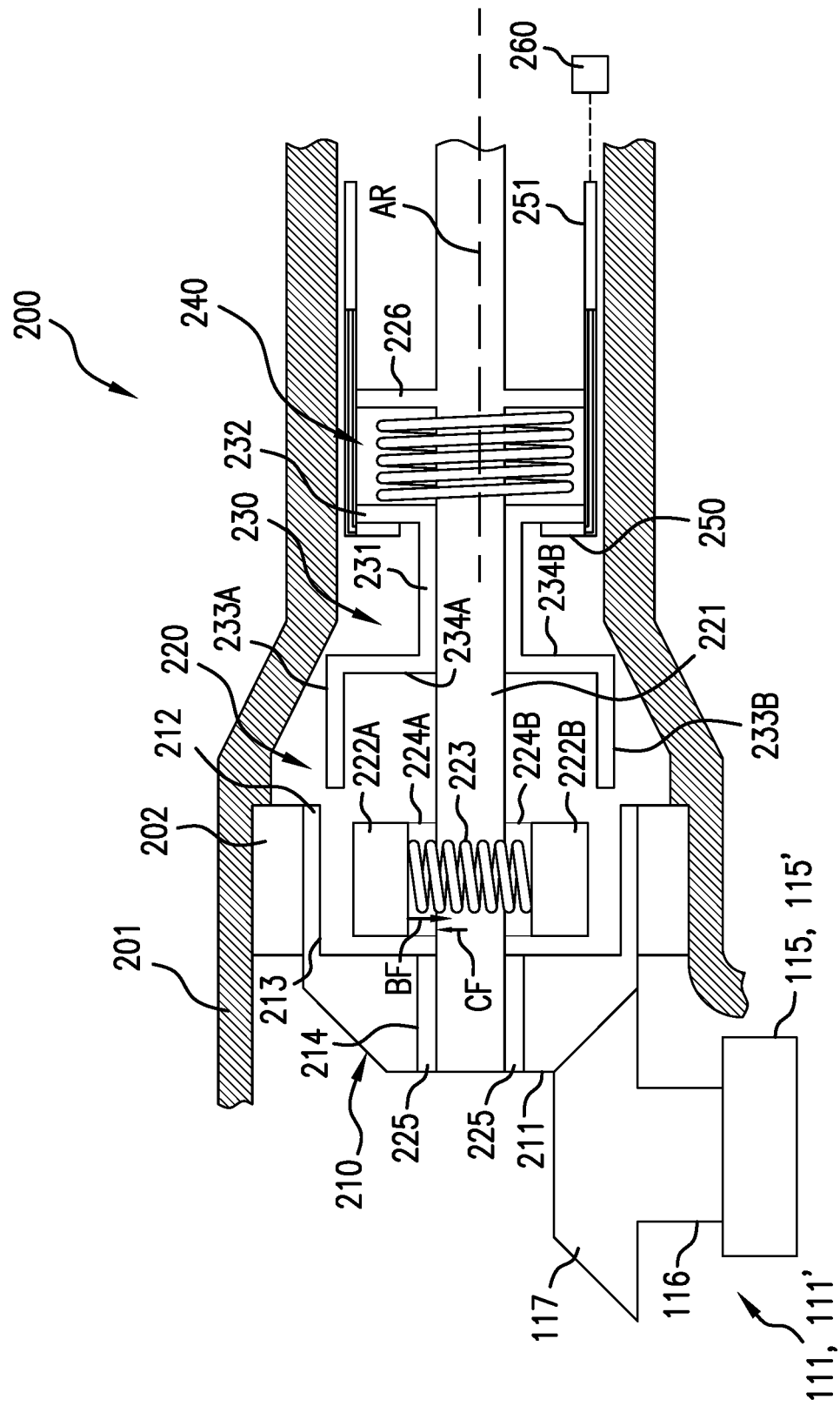
FIG. 2 is a cross-sectional view of an exemplary embodiment of a gearbox that may be incorporated in the headers illustrated in FIGS. 1A and 1B in accordance with the present disclosure, with FIG. 2 illustrating the gearbox when a rotational speed of an intermediate shaft has not reached a threshold value.
Figure 3:
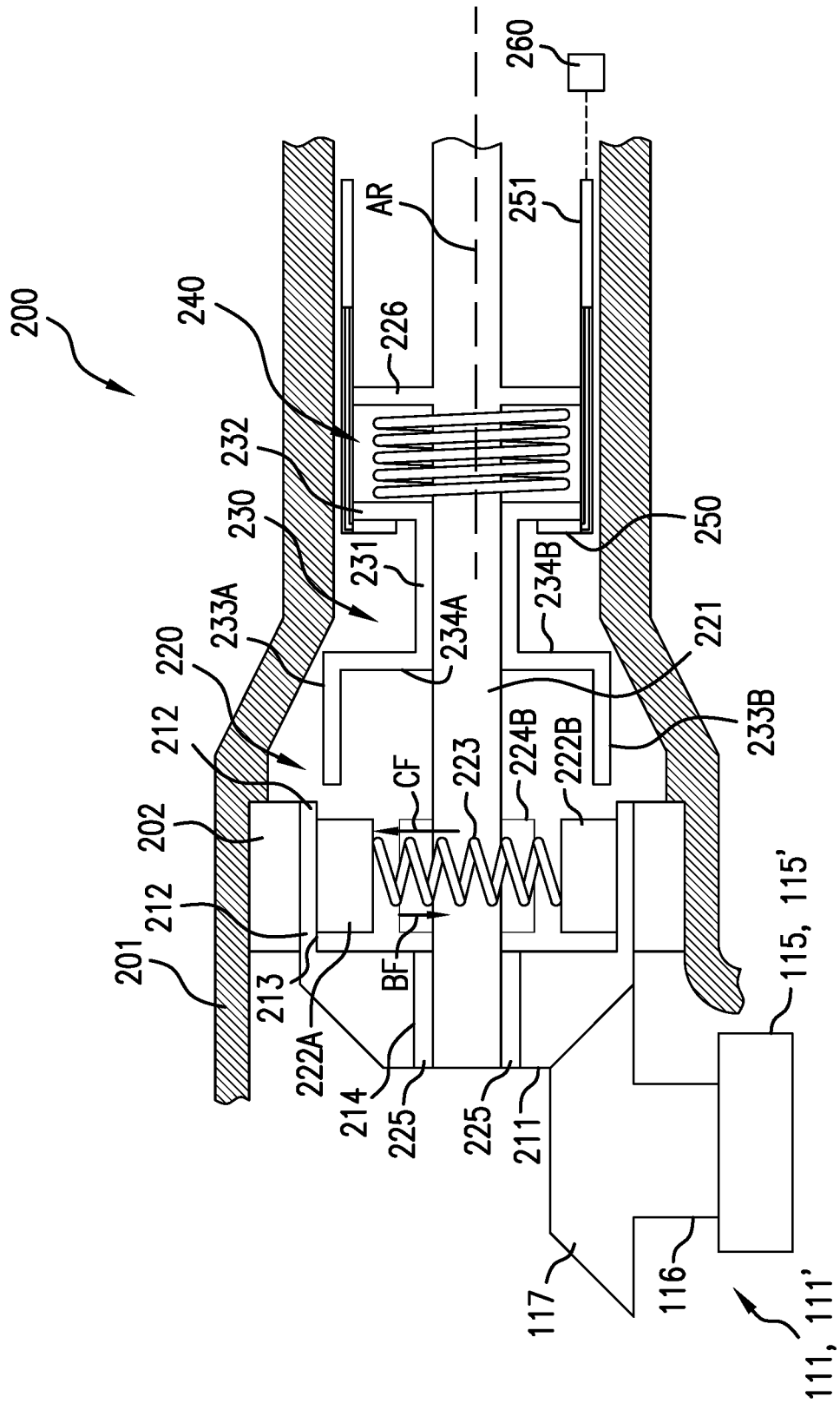
FIG. 3 illustrates the gearbox of FIG. 2 when the rotational speed of the intermediate shaft has reached the threshold value.
Figure 4:
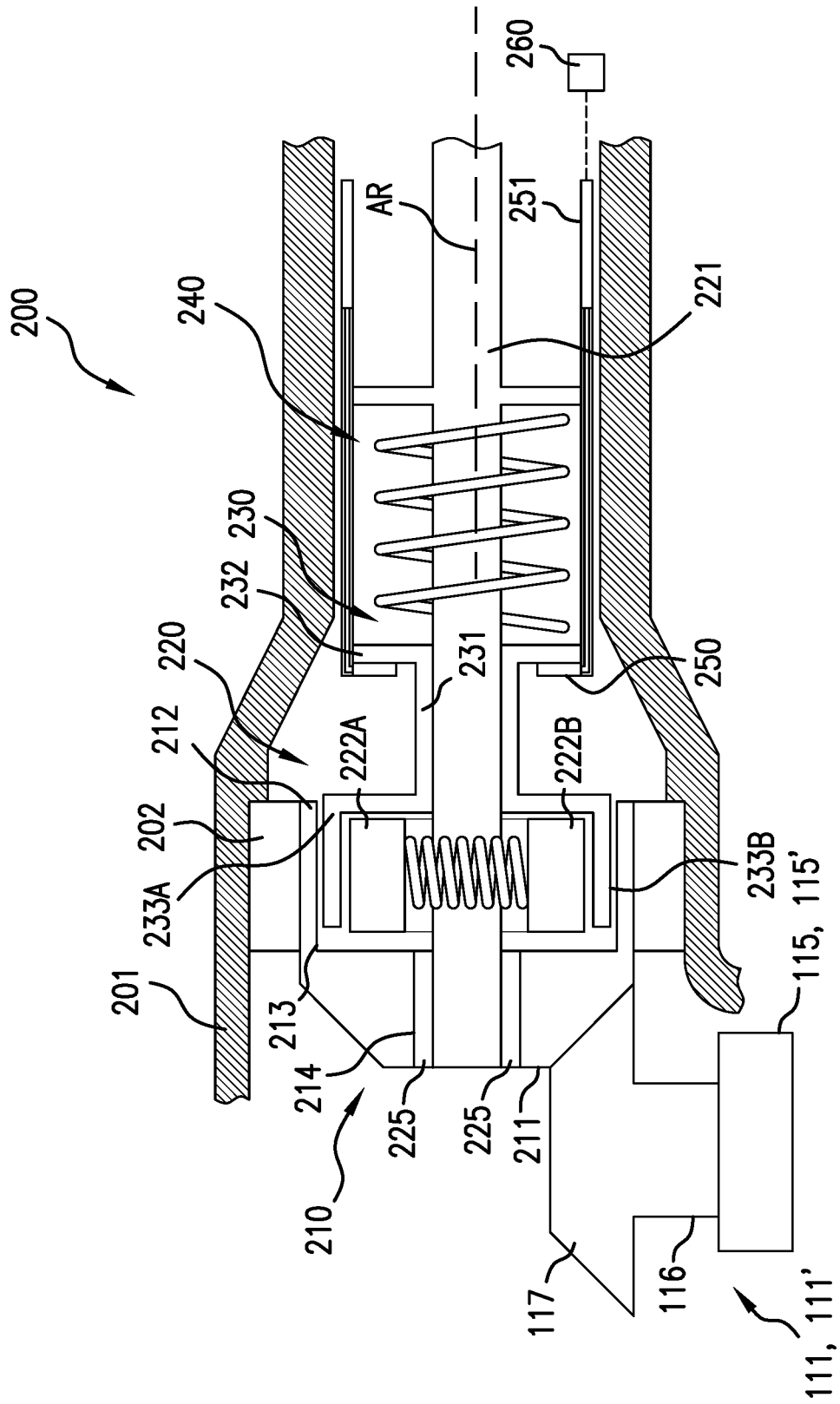
FIG. 4 illustrates the gearbox of FIGS. 2-3 when a disengagement drum has displaced to a neutral position.

Referring specifically now to FIGS. 2-4, an exemplary embodiment of a gearbox 200 for driving a cutting element 115, 115' of the cutting unit 111, 111' is illustrated. The cutting element 115, 115', which may be a cutterbar, a bladed wheel, or other type of element for severing crop material, is coupled to a driveshaft 116. In some embodiments, the driveshaft 116 is directly coupled to the cutting element 115, 115' to drive the cutting element 115, 115' during operation. In some embodiments, the driveshaft 116 is indirectly coupled to the cutting element 115, 115' by a rotary convertor, such as a wobble box, that can convert rotational motion of the driveshaft 116 into linear motion, such as reciprocating motion, of the cutting element 115, 115'. Such constructions are known and therefore further description is omitted for brevity.

The gearbox 200 includes a gearbox output 210 that is rotatably coupled to the driveshaft 116. The gearbox output 210 may include, for example, a toothed portion 211 that meshes with a corresponding toothed portion 117 of the driveshaft 116 so rotation of the toothed portion 211 also causes rotation of the corresponding toothed portion 117. The gearbox output 210 may be formed, for example, as a bevel gear having a friction interface portion 212 with an interface groove 213 formed therein as well as a journaling groove 214, which will be described further herein. The corresponding toothed portion 117 may also be formed as a bevel gear, which is mounted on the driveshaft 116. It should be appreciated that the gearbox output 210 may be rotatably coupled to the driveshaft 116 to transfer rotational motion therebetween in a variety of ways, and the foregoing way is exemplary only. The gearbox output 210 may be disposed in a gearbox housing 201 with a roller bearing 202 placed between the gearbox output 210 and the gearbox housing 201 to maintain the gearbox output 210 position within the gearbox housing 201.

The gearbox 200 includes a clutch 220 including an intermediate shaft 221 and at least one clutch shoe, illustrated as a pair of clutch shoes 222A, 222B, that is rotatably coupled to the intermediate shaft 221. In some embodiments, the clutch 220 is partially or fully housed by the gearbox output 210, which acts a clutch housing. The clutch shoes 222A, 222B are displaceable between a non-engaging position, illustrated in FIGS. 2 and 4, where the clutch shoes 222A, 222B do not engage the gearbox output 210 and an engaging position, illustrated in FIG. 3, where the clutch shoes 222A, 222B engage the gearbox output 210 at, for example, the friction interface portion 212. In some embodiments, the clutch shoes 222A, 222B are biased toward the non-engaging position by one or more springs 223, such as a tension spring. Each of the clutch shoes 222A, 222B may be formed, for example, as a portion of a friction disc that forms a friction interface with the friction interface portion 212 when the clutch shoes 222A, 222B are in the engaging position so rotational motion can be transferred between the clutch shoes 222A, 222B and the gearbox output 210. The clutch shoes 222A, 222B may each rest on a respective boss 224A, 224B that is attached to the intermediate shaft 221 in the non-engaging position. To stabilize the intermediate shaft 221, the intermediate shaft 221 may be journaled within the journaling groove 214 of the gearbox output 210 by a journaling bearing 225. The journaling bearing 225 may comprise, for example, a low friction material such as polytetrafluoroethylene (PTFE).

Referring specifically now to FIG. 3, the gearbox 200 is illustrated when the clutch shoes 222A, 222B have displaced to the engaging position to engage the gearbox output 210 and transfer rotational motion from the intermediate shaft 221 to the driveshaft 116. As previously described, the spring 223 tends to bias the clutch shoes 222A, 222B to the non-engaging position so the clutch shoes 222A, 222B are spaced apart from the friction interface portion 212 of the gearbox output 210. Since the clutch shoes 222A, 222B are rotational coupled to the intermediate shaft 221, rotation of the intermediate shaft 221 about an axis of rotation AR generates a centrifugal force, illustrated as arrow CF, that acts radially away from the axis of rotation AR. The generated centrifugal force CF urges the clutch shoes 222A, 222B toward the friction interface portion 212 of the gearbox output 210 as the intermediate shaft 221 rotates. The generated centrifugal force CF is counteracted by a biasing force, illustrated as arrow BF, acting on the clutch shoes 222A, 222B by the spring 223.

As is known, centrifugal force increases as the angular speed of a rotating object increases. As a rotational speed of the intermediate shaft 221 increases, so too does the generated centrifugal force CF urging the clutch shoes 222A, 222B toward the friction interface portion 212 of the gearbox output 210. When the rotational speed of the intermediate shaft 221 reaches a threshold value, the centrifugal force CF is greater than the counteracting biasing force BF from the spring 223 and causes the clutch shoes 222A, 222B to displace radially away from the intermediate shaft 221 to the engaging position where the clutch shoes 222A, 222B engage the gearbox output 210, as illustrated in FIG. 3. In contrast, when the generated centrifugal force CF is less than the biasing force BF, as illustrated in FIG. 2, the clutch shoes 222A, 222B tend to remain in or displace toward the non-engaging position.

When the clutch shoes 222A, 222B engage the gearbox output 210 in the engaging position, friction between the clutch shoes 222A, 222B and the gearbox output 210 (such as at the friction interface portion 212) opposes relative rotation between the clutch shoes 222A, 222B and the gearbox output 210. Initially, the friction between the clutch shoes 222A, 222B and the gearbox output 210 may not be sufficient to prevent all relative rotation therebetween, resulting in slip. However, the friction between the clutch shoes 222A, 222B and the gearbox output 210 may increase as the rotational speed of the intermediate shaft 221 increases, due to the increasing generated centrifugal force CF, until there is no relative rotation between the clutch shoes 222A, 222B and the gearbox output 210, resulting in the gearbox output 210 rotating at substantially the same speed as the intermediate shaft 221. This rotation of the gearbox output 210 causes a corresponding rotation of the driveshaft 116 to drive the cutting element 115, 115' and sever standing crop material from a field.

From the foregoing, it should be appreciated that the clutch 220 is configured such that the clutch shoes 222A, 222B displace to the engaging position when the rotational speed of the intermediate shaft 221 reaches the threshold value. The threshold value may be, for example, the rotational speed at which the generated centrifugal force CF becomes greater than the counteracting biasing force BF of the spring 223, urging and spontaneously displacing the clutch shoes 222A, 222B toward the engaging position. The threshold rotational speed value can be tuned by, for example, changing the mass of the clutch shoes 222A, 222B and/or changing the biasing force BF in the spring 223. While the biasing force BF is illustrated as originating from the spring 223, it should be appreciated that the biasing force BF can originate from a different element such as, for example, a magnet. Thus, the clutch 220 can be altered in a variety of ways to tune the threshold rotational speed value of the intermediate shaft 221 that displaces the clutch shoes 222A, 222B to the engaging position.

In known agricultural harvesters, various components of the header can be significantly damaged during operation. One particular component that may be significantly damaged is the gearbox of the cutting element(s) due to sudden deceleration forces that occur, for example, when the cutting element(s) contacts a large object such as a rock. The sudden deceleration forces, which can be quite high, transmit through the gearbox and can damage various components, such as the intermediate shaft. This type of damage is costly and time-consuming to repair.

Exemplary embodiments of the gearbox 200 provided in accordance with the present disclosure can be resistant to damage when the cutting element 115, 115' suddenly decelerates. Slippage between the clutch shoes 222A, 222B and the gearbox output 210 mitigates the effects of sudden deceleration by allowing the clutch shoes 222A, 222B to continue rotating at the same rotational speed as the intermediate shaft 221 even if the driveshaft 116 has suddenly decelerated and/or stopped. When the driveshaft 116 suddenly decelerates or stops due to, for example, the cutting element 115, 115' contacting a rock, the gearbox output 210 tends to seize at the interface between the toothed portions 117 and 211. In other words, the friction between the gearbox output 210 and the clutch shoes 222A, 222B that is required to rotate the gearbox output 210 increases. The increase in the required friction to rotate the gearbox output 210 causes the clutch shoes 222A, 222B to slip relative to the gearbox output 210, isolating the intermediate shaft 221 from the sudden deceleration to reduce the risk of damage to components of the gearbox 200. When the friction required to rotate the gearbox output 210 decreases, the friction between the clutch shoes 222A, 222B and the gearbox output 210 can again be sufficient for the gearbox output 210 to rotate at substantially the same speed as the intermediate shaft 221.

Exemplary embodiments of the gearbox 200 provided in accordance with the present disclosure can also allow a gradual wind-down of the driveshaft 116, and thus the cutting element 115, 115', when rotation of the intermediate shaft 221 slows down and/or stops. When the rotational speed of the intermediate shaft 221 goes below the threshold value, the biasing force BF can overcome the generated centrifugal force CF and urge the clutch shoes 222A, 222B toward the non-engaging position and out of engagement with the gearbox output 210. When the clutch shoes 222A, 222B are out of engagement with the gearbox output 210, the gearbox output 210 and the rotatably coupled driveshaft 116 are disengaged from and rotate independently of the intermediate shaft 221. The disengagement of the gearbox output 210 and the driveshaft 116, as well as the cutting element 115, 115', allows a gradual wind-down of the gearbox output 210, the driveshaft 116, and the cutting element 115, 115'. The gradual wind-down of the components allows the inertial force of the cutting element 115, 115' to dissipate relatively slowly, reducing wear on the components and also reducing the risk of damage to the components. Thus, it should be appreciated that exemplary embodiments of the gearbox 200 provided in accordance with the present disclosure is resistant to damage that can occur during operation of the agricultural harvester 100.

In some embodiments, the gearbox 200 may be at least partially filled with oil or other lubricant, such as grease, so the clutch 220 is "wet." Filling the gearbox 200 with lubricant can reduce wear on components of the gearbox 200 and also help dissipate heat that is generated due to the friction between the clutch shoes 222A, 222B and the gearbox output 210. In some embodiments, the clutch 220 is entirely housed within the housing 201 of the gearbox 200, which protects the clutch 220 from debris that may be encountered during harvesting, such as dust or other debris. Keeping the clutch 220 internal to the gearbox 200 can thus provide protection for various components of the gearbox 200 without exposing the clutch 220 to dusty conditions that may cause jamming or other detrimental effects on performance.

In some embodiments, a disengagement drum 230 is provided that is rotatably coupled to the intermediate shaft 221. The disengagement drum 230 may include a connecting portion 231 that is rotatably coupled to the intermediate shaft 221 by, for example, a spline connection. The disengagement drum 230 may also have a bearing portion 232 that bears against, for example, a compression spring 240, as will be described further herein. The compression spring 240 may also bear against a similar bearing portion 226 of the intermediate shaft 221. One or more shoe bearing surfaces, illustrated as a pair of shoe bearing portions 233A, 233B, can be connected to the connecting portion 231. The shoe bearing portions 233A, 233B may extend generally parallel to the axis of rotation AR of the intermediate shaft 221 and connect to the connecting portion 231 via corresponding portions 234A, 234B that extend radially away from the intermediate shaft 221.

The disengagement drum 230 is configured to displace from a drive position, which is illustrated in FIGS. 2-3, to a neutral position, which is illustrated in FIG. 4, where the disengagement drum 230 prevents the clutch shoes 222A, 222B from displacing to the engaging position. As illustrated in FIGS. 2-3, the entirety of the disengagement drum 230 is located outside the space between the clutch shoes 222A, 222B and the gearbox output 210. When the disengagement drum 230 displaces to the neutral position, as illustrated in FIG. 4, portions of the disengagement drum 230, such as the shoe bearing portions 233A, 233B, are disposed between the clutch shoes 222A, 222B and the gearbox output 210. In some embodiments, the disengagement drum 230 displaces axially, i.e., parallel to the axis of rotation AR of the intermediate shaft 221, between the drive position and the neutral position. The shoe bearing portions 233A, 233B prevent the clutch shoes 222A, 222B from engaging the gearbox output 210 when the disengagement drum 230 is in the neutral position. The disengagement drum 230 is rotatably coupled with the intermediate shaft 221, as are the clutch shoes 222A, 222B, so the disengagement drum 230 and the clutch shoes 222A, 222B rotate together without the clutch shoes 222A, 222B displacing to the engaging position and engaging the gearbox output 210, regardless of the rotational speed of the intermediate shaft 221. Thus, the disengagement drum 230 allows for the gearbox 200 to be set in a neutral position where the intermediate shaft 221 and clutch shoes 222A, 222B rotate freely without rotating the gearbox output 210 and driving the cutting element 115, 115' via the driveshaft 116.

In some embodiments, displacement of the disengagement drum 230 between the drive position and the neutral position can be at least partially controlled by a shift fork 250 and the spring 240. The shift fork 250 may, for example, have a first position, illustrated in FIGS. 2-3, where the shift fork 250 holds the disengagement drum 230 in the drive position against force of the spring 240 that urges the disengagement drum 230 toward the neutral position. When the shift fork 250 moves to a second position, illustrated in FIG. 4, toward the gearbox output 210, the shift fork 250 no longer holds the disengagement drum 230 in the drive position so the spring 240 can displace the disengagement drum 230 to the neutral position. When it is desired to displace the disengagement drum 230 to the drive position from the neutral position, the shift fork 250 can be displaced to the first position to displace the disengagement drum 230 to the drive position against the force of the spring 240 and hold the disengagement drum 230 in the drive position. The position of the shift fork 250 may be controlled, for example, by a lever or switch that is located in the operator cab 104 of the harvester 100. Activation of the lever or switch can displace the shift fork 250 between the first position and the second position, and vice versa, and thus control whether the disengagement drum 230 is in the drive position or the neutral position. Alternatively, or in addition, to using a lever or switch in the operator cab 104, the position of the shift fork 250 may be controlled by an actuator 251 that is coupled to the shift fork 250 and controlled by a controller 260.

Providing the disengagement drum 230 that can displace between the drive position and the neutral position allows, for example, an operator to control what cutting elements 115, 115' of the header 110, 110' are driven at the gearbox 200. For example, an operator may wish to prevent driving one of the cutting elements 115, 115' of the header 110, 110' because the cutting element is damaged or will not be used at a certain location in a field. The operator may activate the previously described switch or lever so the disengagement drum 230 displaces to the neutral position and prevents driving of the cutting element without affecting other cutting elements from being driven. Such a configuration, therefore, can allow an operator to control driving of each individual cutting element at the corresponding gearbox for each cutting element independently of the other cutting elements.

In some embodiments, the controller 260 is configured to activate the actuator 251 and control the shift fork 250 to displace the disengagement drum 230 when one or more displacement criteria is present. The displacement criteria may correspond to various scenarios that indicate damage, or a significant risk of damage, to components of the header 110, 110'. Exemplary displacement criteria include, but are not limited to, detection of a damaged cutting element, excessive slip between the clutch shoes 222A, 222B and the gearbox output 210, or undesired displacement of the clutch shoes 222A, 222B to the non-engaging position. The displacement criteria may also correspond to various scenarios when driving one or more of the cutting elements is unnecessary, such as when the cutting element will be passing over an area of the field where there is no standing crop, which may be determined by the controller 260 based on location signals and a map of the field. It should thus be appreciated that the disengagement drum 230 provides a convenient way to put the gearbox 200 in a neutral state and protect components of the header 110, 110' from damage and unnecessary wear.

Figure 5:
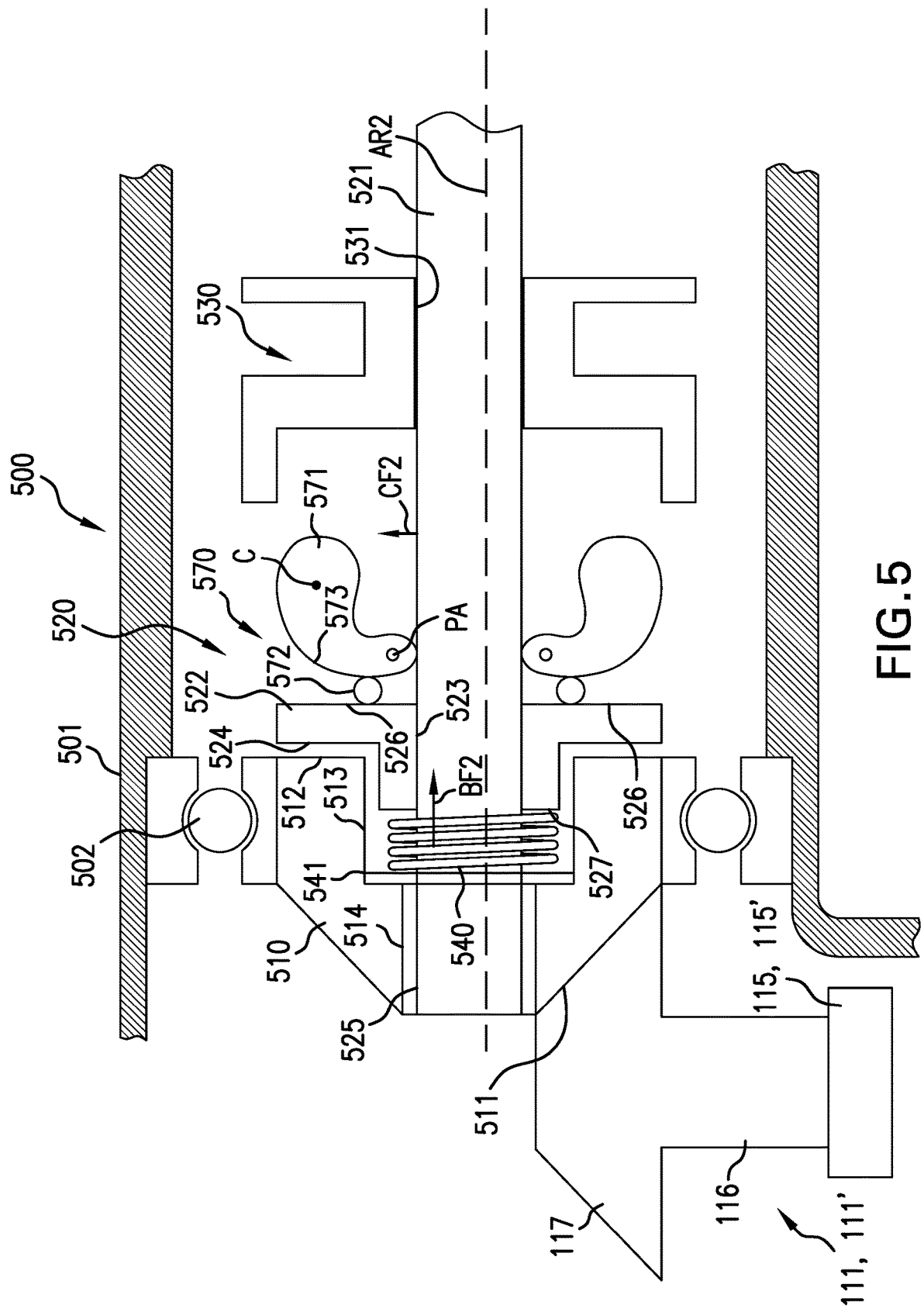
FIG. 5 is a cross-sectional view of another exemplary embodiment of a gearbox that may be incorporated in the headers illustrated in FIGS. 1A and 1B in accordance with the present disclosure, with FIG. 5 illustrating the gearbox when a rotational speed of an intermediate shaft has not reached a threshold value.
Figure 6:
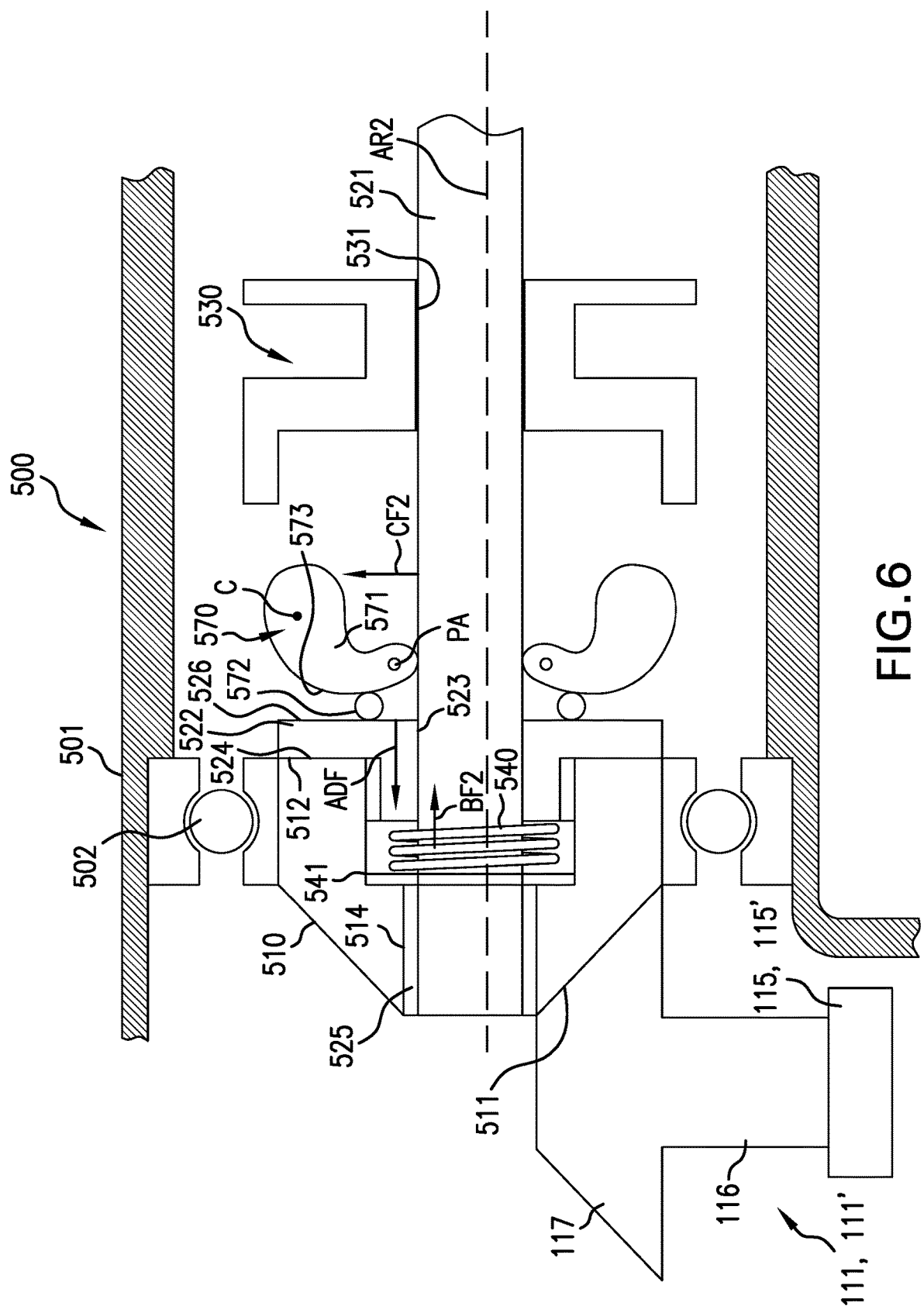
FIG. 6 illustrates the gearbox of FIG. 5 when the rotational speed of the intermediate shaft has reached the threshold value.
Figure 7:
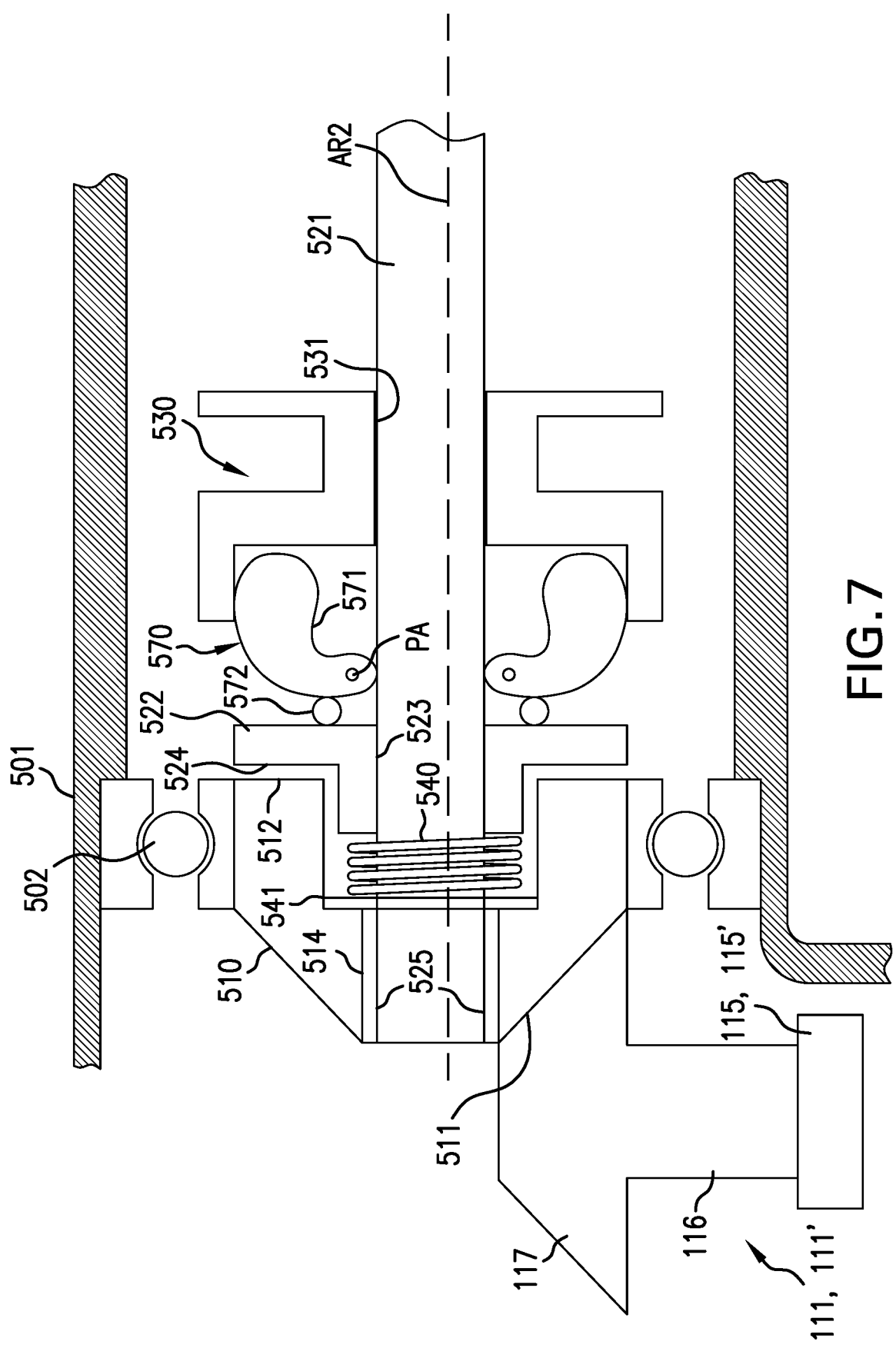
FIG. 7 illustrates the gearbox of FIGS. 5-6 when a disengagement drum has displaced to a neutral position.

Referring now to FIGS. 5-7, another exemplary embodiment of a gearbox 500 provided in accordance with the present disclosure is illustrated that has a clutch 520 with one clutch shoe 522 and a displacement assembly 570. Similarly to the previously described gearbox 200, the gearbox 500 includes a gearbox output 510 that is rotatably coupled to the driveshaft 116 of the cutting unit 111, 111'. The gearbox output 510 may include a toothed portion 511 that meshes with the toothed portion 117 and a friction interface portion 512. Unlike the friction interface portion 212 of the gearbox output 210, which faces and extends parallel to the intermediate shaft 221, the friction interface portion 512 of the gearbox output 510 may be a surface of the gearbox output 510 that extends perpendicularly to an intermediate shaft 521, the significance of which will be described further herein. In other respects, the gearbox output 510 may be similar to the previously described gearbox output 210 and include a groove 513 that houses a portion of the intermediate shaft 521 and a journaling groove 514 to journal the intermediate shaft 521 therein with a journaling bearing 525. The gearbox output 510 may be placed within a housing 501 of the gearbox 500, with a ball bearing 502, or other type of bearing, disposed between the gearbox output 510 and the housing 501.

The clutch shoe 522 may be formed as a drum-like clutch shoe, rather than a disc-like clutch shoe. The clutch shoe 522 may include a shaft connecting portion 523 that is rotatably coupled to the intermediate shaft 521 and an output engaging portion 524 that faces the friction interface portion 512 of the gearbox output 510. In some embodiments, the clutch shoe 522 is configured to displace axially, i.e., parallel to an axis of rotation AR2 of the intermediate shaft 521, with the shaft connecting portion 523 extending predominantly parallel to the axis of rotation AR2 and the output engaging portion 524 extending predominantly perpendicularly to the axis of rotation AR2.

As illustrated in FIG. 5, the clutch shoe 522 is in a non-engaging position where the output engaging portion 524 is not engaging the friction interface portion 512 of the gearbox output 510. When the clutch shoe 522 is in this position, the clutch 520 does not drive the cutting element 115, 115', similarly to the previously described clutch 220. Unlike the clutch shoes 222A, 222B of the clutch 220, which displace radially between the non-engaging position to the engaging position, the clutch shoe 522 displaces axially between the non-engaging position and its corresponding engaging position where the clutch shoe 522 engages the friction interface portion 512 of the gearbox output 510.

To displace the clutch shoe 522 to the engaging position, the clutch 520 includes a displacement assembly 570 with at least one arm 571 that is rotatably coupled to the intermediate shaft 521 and pivotable relative to the intermediate shaft 521. The arm 571 may pivot, for example, about a pivot axis PA of the arm 571, which may be a pivot pin or similar construction. The arm 571 may have an irregularly curved shape and weight distribution so the arm 571 defines a center of gravity C that is radially offset from the pivot axis PA when the arm 571 is in a first orientation, which is illustrated in FIG. 5. A roller 572 is provided between and bearing on a curved surface 573 of the arm 571 and a roller surface 526 of the clutch shoe 522, the significance of which will be described further herein. A spring 540 may also bear on the clutch shoe 522 on a spring surface 527 opposite the roller surface 526. The spring 540 can be a compression spring that biases the clutch shoe 522 axially away from the gearbox output 510 and toward the arm 571, i.e., the spring 540 provides a biasing force, illustrated as arrow BF2, to bias the clutch shoe 522 toward the non-engaging position. In some embodiments, a thrust bearing 541 or other type of bearing may be placed between the spring 540 and the gearbox output 510.

In the embodiment illustrated in FIGS. 5-7, the clutch 520 is configured such that the clutch shoe 522 displaces to the engaging position when a rotational speed of the intermediate shaft 521 reaches a threshold value. Unlike the previously described clutch 220, which has clutch shoes 222A, 222B that displace radially between the non-engaging position and the engaging position, the clutch shoe 522 displaces axially between the non-engaging position and the engaging position. Because a generated centrifugal force, illustrated as arrow CF2 in FIGS. 5-7, acts radially, rather than axially, the displacement assembly 570 is provided to convert the radial centrifugal force CF2 into an axial force that displaces the clutch shoe 522 to the engaging position.

Referring specifically now to be FIG. 6, the gearbox 500 is illustrated when a rotational speed of the intermediate shaft 521 has reached a threshold value so the clutch shoe 522 displaces to the engaging position to engage the gearbox output 510 and rotate the driveshaft 116. As can be seen, the generated centrifugal force CF2 acts on the arm 571 and pivots the arm 571 about the pivot axis PA from the first position, illustrated in FIG. 5, to a second position, illustrated in FIG. 6. Pivoting of the arm 571 forces the roller 572 against the roller surface 526 of the clutch shoe 522 and produces an axial displacement force, illustrated as arrow ADF, that counteracts the biasing force BF2 from the spring 540.

As can be appreciated, pivoting of the arm 571 is due to the radial offsetting between the center of gravity C and the pivot axis PA of the arm 571. As the generated centrifugal force CF2 acts on the arm 571, the arm 571 tends to pivot toward radial alignment of the center of gravity C and the pivot axis PA, generating the axial displacement force ADF that displaces the clutch shoe 522. Pivoting of the arm 571 is opposed by the biasing force BF2, which counteracts the axial displacement force ADF. Once the centrifugal force CF2 is high enough to generate an axial displacement force ADF that overcomes the biasing force BF2, the arm 571 pivots and the clutch shoe 522 displaces toward the engaging position. It should be appreciated that the threshold rotational speed value for displacing the clutch shoe 522 to the engaging position can be adjusted by, for example, adjusting the biasing force BF2 provided by the spring 540 and/or adjusting a mass of the arm 571 and/or adjusting a mass distribution of the arm 571 to alter the center of gravity C of the arm 571.

In some embodiments, the arm 571 is configured so its center of gravity C radially aligns with its pivot axis PA at a maximum displacement value of the rotational speed of the intermediate shaft 521. Once the center of gravity C and pivot axis PA are radially aligned, the arm 571 does not tend to further pivot about the pivot axis PA regardless of the generated centrifugal force CF2, which can limit the amount of friction exerted on the friction interface portion 512 of the gearbox output 510 by the clutch shoe 522.

From the foregoing, it should be appreciated that the clutch 520 is configured so the clutch shoe 522 can spontaneously displace to the engaging position when the rotational speed of the intermediate shaft 521 reaches the threshold value. In this respect, the clutch 520 is similar to the previously described clutch 220, with the most notable difference being the inclusion of the displacement assembly 570 to convert the radial centrifugal force CF2 into the axial displacement force ADF and displace the clutch shoe 522 to the engaging position. It should be appreciated that the gearbox 500 can protect components of the header 110, 110' similarly to the previously described gearbox 200, with such protection mechanisms being previously described and therefore omitted from further description for brevity.

In some embodiments, the gearbox 500 is provided with a disengagement drum 530 that is configured to prevent the clutch shoe 522 from displacing to the engaging position when the intermediate shaft 521 reaches the threshold rotational speed value. Similarly to the previously described disengagement drum 230, the disengagement drum 530 may be rotationally coupled to the intermediate shaft 521 by a splined connecting portion 531 and axially displaceable from a drive position, illustrated in FIGS. 5-6, to a neutral position, illustrated in FIG. 7. To prevent displacement of the clutch shoe 522 to the engaging position, the disengagement drum 530 may prevent the arm 571 from further pivoting, or pivoting at all, when the disengagement drum 530 is in the neutral position. When the arm 571 is prevented from pivoting, the axial displacement force ADF needed to displace the clutch shoe 522 to the engaging position may not be generated, thus preventing the clutch shoe 522 from displacing to the engaging position even when the rotational speed of the intermediate shaft 521 reaches the threshold value. Thus, it should be appreciated that the disengagement drum 530 can be utilized to prevent the clutch shoe 522 from displacing to the engaging position by preventing pivoting of the arm 571 and place the gearbox 500 in a neutral state. It should be further appreciated that the disengagement arm 530 can be controlled similarly to the previously described disengagement arm 230, with further description of such control being omitted for brevity.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural header, comprising:
a header frame;
at least one cutting unit carried by the header frame and comprising a cutting element and a driveshaft coupled to the cutting element;
a gearbox configured to drive the cutting element, the gearbox comprising:
a gearbox output rotatably coupled to the driveshaft; and
a clutch comprising an intermediate shaft and at least one clutch shoe rotatably coupled to the intermediate shaft and displaceable between a non-engaging position where the at least one clutch shoe does not engage the gearbox output and an engaging position where the at least one clutch shoe engages the gearbox output, the clutch being configured such that the at least one clutch shoe displaces to the engaging position when a rotational speed of the intermediate shaft reaches a threshold value; and
a disengagement drum rotatably coupled to the intermediate shaft and configured to displace from a drive position to a neutral position where the disengagement drum prevents the at least one clutch shoe from displacing to the engaging position.

2. The agricultural header of claim 1, wherein the at least one clutch shoe comprises a pair of clutch shoes biased toward the non-engaging position by at least one spring.

3. The agricultural header of claim 2, wherein the clutch shoes are configured to displace radially away from the intermediate shaft to the engaging position.

4. The agricultural header of claim 3, wherein the disengagement drum is configured to displace axially to the neutral position.

5. The agricultural header of claim 1, wherein the clutch further comprises a displacement assembly comprising at least one arm rotatably coupled with and pivotable relative to the intermediate shaft and a roller contacting the at least one arm and the at least one clutch shoe, the at least one arm being configured to pivot relative to the intermediate shaft and displace the at least one clutch shoe to the engaging position when the rotational speed of the intermediate shaft reaches the threshold value.

6. The agricultural header of claim 5, further comprising a spring biasing the at least one clutch shoe toward the non-engaging position.

7. The agricultural header of claim 6, wherein the disengagement drum prevents the at least one arm from pivoting to displace the at least one clutch shoe to the engaging position when in the neutral position.

8. The agricultural header of claim 5, wherein the at least one clutch shoe displaces axially to the engaging position.

9. An agricultural harvester, comprising:
a chassis; and
a header carried by the chassis, the header comprising:
a header frame;
at least one cutting unit carried by the header frame and comprising a cutting element and a driveshaft coupled to the cutting element;
a gearbox configured to drive the cutting element, the gearbox comprising:
a gearbox output rotatably coupled to the driveshaft; and
a clutch comprising an intermediate shaft and at least one clutch shoe rotatably coupled to the intermediate shaft and displaceable between a non-engaging position where the at least one clutch shoe does not engage the gearbox output and an engaging position where the at least one clutch shoe engages the gearbox output, the clutch being configured such that the at least one clutch shoe displaces to the engaging position when a rotational speed of the intermediate shaft reaches a threshold value; and
a disengagement drum rotatably coupled to the intermediate shaft and configured to displace from a drive position to a neutral position where the disengagement drum prevents the at least one clutch shoe from displacing to the engaging position.

10. The agricultural harvester of claim 9, wherein the at least one clutch shoe comprises a pair of clutch shoes biased toward the non-engaging position by at least one spring.

11. The agricultural harvester of claim 10, wherein the clutch shoes are configured to displace radially away from the intermediate shaft to the engaging position.

12. The agricultural harvester of claim 9, wherein the disengagement drum is configured to displace axially to the neutral position.

13. The agricultural harvester of claim 9, wherein the clutch further comprises a displacement assembly comprising at least one arm rotatably coupled with and pivotable relative to the intermediate shaft and a roller contacting the at least one arm and the at least one clutch shoe, the at least one arm being configured to pivot relative to the intermediate shaft and displace the at least one clutch shoe to the engaging position when the rotational speed of the intermediate shaft reaches the threshold value.

14. The agricultural harvester of claim 13, further comprising a spring biasing the at least one clutch shoe toward the non-engaging position.

15. The agricultural harvester of claim 14, wherein the disengagement drum prevents the at least one arm from pivoting to displace the at least one clutch shoe to the engaging position when in the neutral position.

16. The agricultural harvester of claim 13, wherein the at least one clutch shoe displaces axially to the engaging position.

* * * * *